United States Patent
Ohtake et al.

(10) Patent No.: US 10,608,526 B2
(45) Date of Patent: Mar. 31, 2020

(54) DEVICE AND METHOD FOR CALCULATING SWITCHING TIME

(71) Applicant: Sanken Electric Co., Ltd., Saitama (JP)

(72) Inventors: Osamu Ohtake, Saitama (JP); Ryuichi Furukoshi, Saitama (JP)

(73) Assignee: Sanken Electric Co., Ltd., Saitama (JP)

( * ) Notice: Subject to any disclaimer, the term of this patent is extended or adjusted under 35 U.S.C. 154(b) by 0 days.

(21) Appl. No.: 16/108,283

(22) Filed: Aug. 22, 2018

(65) Prior Publication Data

US 2020/0067403 A1  Feb. 27, 2020

(51) Int. Cl.
| | | |
|---|---|---|
| *H02M 3/157* | (2006.01) | |
| *H02M 1/42* | (2007.01) | |
| *H02M 7/5395* | (2006.01) | |
| *H02M 1/00* | (2006.01) | |

(52) U.S. Cl.
CPC ............. *H02M 1/42* (2013.01); *H02M 3/157* (2013.01); *H02M 7/5395* (2013.01); *H02M 2001/0009* (2013.01); *H02M 2001/0012* (2013.01)

(58) Field of Classification Search
CPC . H02M 2001/0009; H02M 2001/0012; H02M 3/156; H02M 3/157; H02M 1/42; H02M 1/4225; H02M 7/5395
See application file for complete search history.

(56) References Cited

U.S. PATENT DOCUMENTS

| | | | | |
|---|---|---|---|---|
| 7,923,973 B2* | 4/2011 | Odell | ................... | H02M 3/156 323/207 |
| 2008/0310201 A1* | 12/2008 | Maksimovic | ....... | H02M 3/1584 363/85 |
| 2011/0216558 A1* | 9/2011 | Uno | ................... | H02M 1/4225 363/21.12 |
| 2012/0057382 A1 | 3/2012 | Uno | | |
| 2013/0057230 A1* | 3/2013 | Lim | ................... | H02M 1/4225 323/209 |
| 2014/0097821 A1* | 4/2014 | Chen | ................... | H02M 1/4225 323/293 |
| 2015/0303790 A1* | 10/2015 | Lin | ................... | H02M 1/4225 363/89 |

\* cited by examiner

*Primary Examiner* — Jeffrey A Gblende
*Assistant Examiner* — Jye-June Lee
(74) *Attorney, Agent, or Firm* — Harness, Dickey & Pierce, P.L.C.

(57) ABSTRACT

A device and method for calculating switching time. The device includes: a digital calculator configured to calculate a next on time according to an output voltage signal and an inductor current signal detected during an on period of a switching element and calculate a next off time according to the next on time, an input voltage signal and the output voltage signal; and a signal generator configured to generate a pulse width modulation signal for controlling the switching element, according to the next on time and the next off time. Therefore, a digital controlling manner is provided, not only the number of components and the cost are decreased, but also detection accuracy is improved with a simple structure.

16 Claims, 5 Drawing Sheets

DEVICE AND METHOD FOR CALCULATING SWITCHING TIME

TECHNICAL FIELD

Embodiments of the present disclosure generally relate to the field of power control circuits, and more particularly, to a device and method for calculating switching time.

BACKGROUND

In order to perform harmonic current regulation, a power factor correction (PFC) converter is often added into a power supply. FIG. 1 is a schematic diagram which shows a PFC circuit in the prior art. As shown in FIG. 1, a PFC converter 100 includes a rectifier circuit 101 configured to rectify an alternating-current voltage received from an alternating-current power supply; and a series circuit 102 configured to connect to the rectifier circuit 101, and at least include an inductor 1021 and a switching element 1022.

As shown in FIG. 1, the PFC converter 100 may further include a capacitor C1, a diode D1 and a capacitor C2. As shown in FIG. 1, an input voltage signal (Vin) and an output voltage signal (Vout) can be detected. Furthermore, a current IL flows through the inductor 1021 and flows through the switching element 1022 when the switching element 1022 is on; in addition, a driver signal (Vgs) is provided to control the switching element 1022.

FIG. 2 is a schematic diagram which shows another PFC circuit in the prior art, in which an analog manner is provided. As shown in FIG. 2, the driver signal (Vgs) is provided by an analog controlling circuit 201. The analog controlling circuit 201 at least includes three analog comparator and a multiplier; furthermore, a phase adjustment capacitor 202 and a gain adjustment resistor 203 need to be configured independently in order to perform phase adjustment or gain adjustment. Therefore, the number of components and the cost need to be decreased.

FIG. 3 is a schematic diagram which shows another PFC circuit in the prior art, in which an analog and digital combined manner is provided. As shown in FIG. 3, the driver signal (Vgs) is provided by an analog/digital controlling circuit 301. The analog/digital controlling circuit 301 at least includes a central processing unit (CPU), a pulse width modulation (PWM) circuit and an analog comparator 302; Furthermore, the analog/digital controlling circuit 301 may further include an analog-digital converter (ADC) and a digital-analog converter (DAC).

Compared to the analog controlling manner in FIG. 2, the analog and digital combined manner is provided in FIG. 3. For the analog and digital combined manner, an inductor current IL_1 detected at a switching element 303 is compared with a specified value in the analog comparator 302 to control on/off of the switching element 303.

Reference document 1: US2012/0057382A1

This section introduces aspects that may facilitate a better understanding of the disclosure. Accordingly, the statements of this section are to be read in this light and are not to be understood as admissions about what is in the prior art or what is not in the prior art.

SUMMARY

The inventor found that for the analog and digital combined manner, the inductor current need to be detected (or sampled) immediately after the switching element is turned on, while a surge current is often generated by a recovery current of the diode D1 at the moment, therefore a problem of detection error may be occurred.

Furthermore, for the analog and digital combined manner, the analog comparator is required to make the switching element turn off when the inductor current reaches the specified value, therefore the number of components and the cost are relatively large and need to be further decreased.

In order to solve at least part of the above problems, methods, apparatus, devices are provided in the present disclosure. Features and advantages of embodiments of the present disclosure will also be understood from the following description of specific embodiments when read in conjunction with the accompanying drawings, which illustrate, by way of example, the principles of embodiments of the present disclosure.

In general, embodiments of the present disclosure provide a device and method for calculating switching time. It is expected to decrease the number of components and the cost while improve detection accuracy with a simple structure.

In a first aspect, a device for calculating switching time is provided. The device includes: a digital calculator configured to calculate a next on time according to an output voltage signal and an inductor current signal detected during an on period of a switching element and calculate a next off time according to the next on time, an input voltage signal and the output voltage signal; and a signal generator configured to generate a pulse width modulation signal for controlling the switching element, according to the next on time and the next off time.

In one embodiment, the digital calculator is further configured to calculate an integral value according to an average value of the inductor current signal and an on time, and calculate the next on time according to the integral value and the detected inductor current signal.

In one embodiment, the digital calculator is configured to calculate the next on time by using the formula: $T_{on}[n+1]=\text{Ver}/\text{Id}[n]$; where, Ver denotes a target integral value of the inductor current signal during on time of the $(n+1)^{th}$ period and is based on the output voltage signal, Id[n] denotes the detected inductor current signal during on time of the $n^{th}$ period, $T_{on}[n+1]$ denotes the on time of the $(n+1)^{th}$ period.

In one embodiment, the device further includes: a first analog-digital converter configured to convert the inductor current signal into a digital value; a second analog-digital converter configured to convert the input voltage signal into a digital value; and a third analog-digital converter configured to convert the output voltage signal into a digital value.

In one embodiment, the device further includes: a current detecting circuit configured to detect the inductor current signal during the on period of the switching element; an input voltage detecting circuit configured to detect the input voltage signal; and an output voltage detecting circuit configured to detect the output voltage signal.

In one embodiment, the current detecting circuit is configured to detect the inductor current signal at least one time during one on period of the switching element.

In one embodiment, the current detecting circuit is configured to detect the inductor current signal at a moment of a half of the on period; and the digital calculator is configured to determine an average value of the inductor current signal according to the inductor current signal detected at the moment of the half of the on period.

In one embodiment, the digital calculator is configured to calculate the integral value by using the formula: $\text{Ver}=\text{Id}[n]\times T_{on}[n]$; where, Ver denotes a target integral value of the inductor current signal during on time of the $(n+1)^{th}$ period and is based on the output voltage signal, Id[n] denotes the inductor current signal detected at a moment of a half of the on time of the $n^{th}$ period, $T_{on}[n]$ denotes the on time of the $n^{th}$ period.

In one embodiment, the digital calculator is further configured to calculate a difference voltage signal according to the input voltage signal and the output voltage signal, and calculate an error voltage signal according to the output voltage signal and a reference voltage signal.

In one embodiment, the digital calculator is further configured to calculate the next off time according to the next on time, the difference voltage signal and the error voltage signal.

In a second aspect, a power factor correction converter is provided, the power factor correction converter includes: a rectifier circuit configured to rectify an alternating-current voltage received from an alternating-current power supply; a series circuit configured to connect to the rectifier circuit, at least comprise an inductor and a switching element; a current detecting circuit configured to detect an inductor current signal during a on period of the switching element; an input voltage detecting circuit configured to detect an input voltage signal; an output voltage detecting circuit configured to detect an output voltage signal; and a switching controlling circuit configured to control on/off of the switching element.

The switching controlling circuit at least includes: a digital calculator configured to calculate a next on time according to the output voltage signal and an inductor current signal detected during the on period of the switching element and calculate a next off time according to the next on time, the input voltage signal and the output voltage signal; and a signal generator configured to generate a pulse width modulation signal for controlling the switching element, according to the next on time and the next off time.

In one embodiment, the switching controlling circuit further includes: a first analog-digital converter configured to convert the inductor current signal into a digital value; a second analog-digital converter configured to convert the input voltage signal into a digital value; and a third analog-digital converter configured to convert the output voltage signal into a digital value.

In a third aspect, a method for calculating switching time is provided. The method includes: calculating a next on time according to an output voltage signal and an inductor current signal detected during an on period of a switching element; calculating a next off time according to the next on time, an input voltage signal and the output voltage signal; and generating a pulse width modulation signal for controlling the switching element, according to the next on time and the next off time.

In one embodiment, the method further includes: calculating an integral value according to an average value of the inductor current signal and an on time, and the next on time is calculated according to the integral value and the detected inductor current signal.

In one embodiment, the method further includes: calculating a difference voltage signal according to the input voltage signal and the output voltage signal, and calculating an error voltage signal according to the output voltage signal and a reference voltage signal. The next off time is calculated according to the next on time, the difference voltage and the error voltage signal.

According to various embodiments of the present disclosure, a digital calculator is configured to calculate a next on time according to an output voltage signal and an inductor current signal detected during an on period of a switching element and calculate a next off time according to the next on time, an input voltage signal and the output voltage signal. Therefore, a digital controlling manner is provided, not only the number of components and the cost are decreased, but also detection accuracy is improved with a simple structure.

BRIEF DESCRIPTION OF THE DRAWINGS

The above and other aspects, features, and benefits of various embodiments of the disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which.

DETAILED DESCRIPTION

The present disclosure will now be described with reference to several example embodiments. It should be understood that these embodiments are discussed only for the purpose of enabling those skilled persons in the art to better understand and thus implement the present disclosure, rather than suggesting any limitations on the scope of the present disclosure.

It should be understood that when an element is referred to as being "connected" or "coupled" or "contacted" to another element, it may be directly connected or coupled or contacted to the other element or intervening elements may be present. In contrast, when an element is referred to as being "directly connected" or "directly coupled" or "directly contacted" to another element, there are no intervening elements present. Other words used to describe the relationship between elements should be interpreted in a like fashion (e.g., "between" versus "directly between", "adjacent" versus "directly adjacent", etc.).

As used herein, the terms "first" and "second" refer to different elements. The singular forms "a" and "an" are intended to include the plural forms as well, unless the context clearly indicates otherwise. The terms "comprises,"

"comprising," "has," "having," "includes" and/or "including" as used herein, specify the presence of stated features, elements, and/or components and the like, but do not preclude the presence or addition of one or more other features, elements, components and/or combinations thereof.

The term "based on" is to be read as "based at least in part on". The term "cover" is to be read as "at least in part cover". The term "one embodiment" and "an embodiment" are to be read as "at least one embodiment". The term "another embodiment" is to be read as "at least one other embodiment". Other definitions, explicit and implicit, may be included below.

In this disclosure, unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Figure 1:
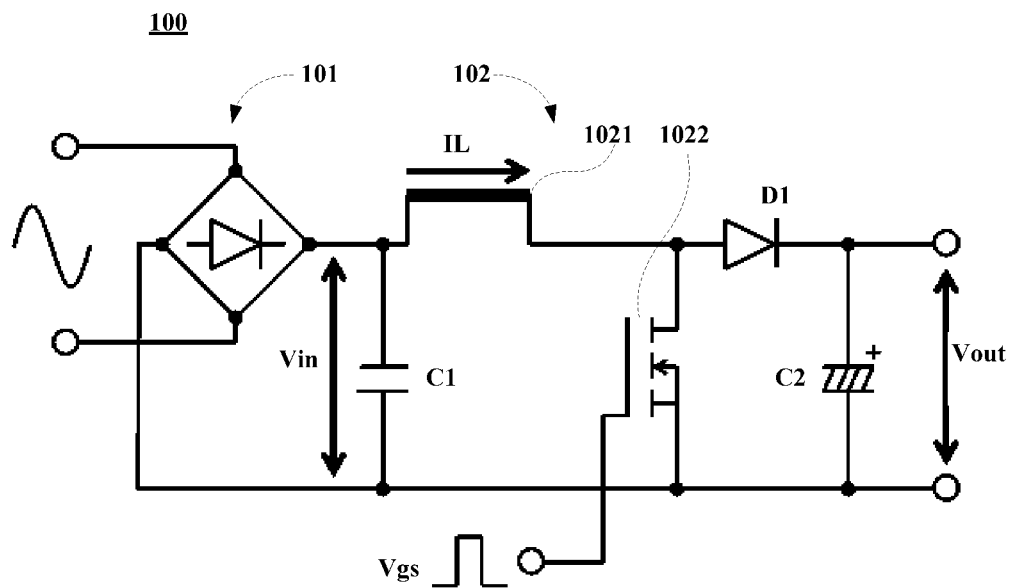
FIG. 1 is a schematic diagram which shows a PFC circuit in the prior art.
Figure 2:
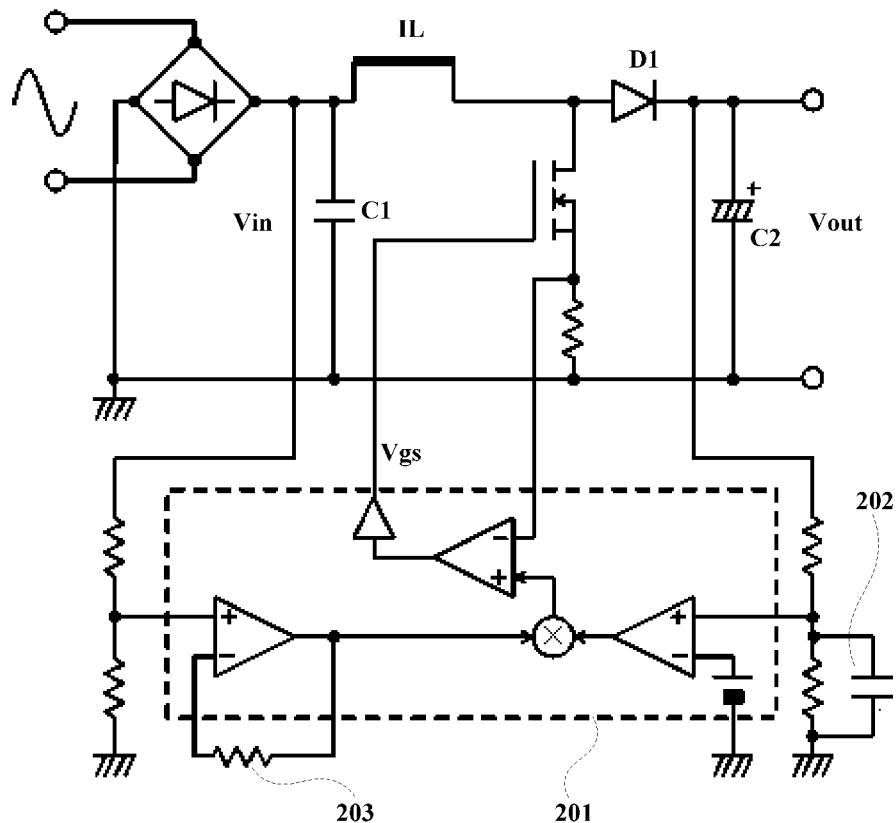
FIG. 2 is a schematic diagram which shows another PFC circuit in the prior art.
Figure 3:
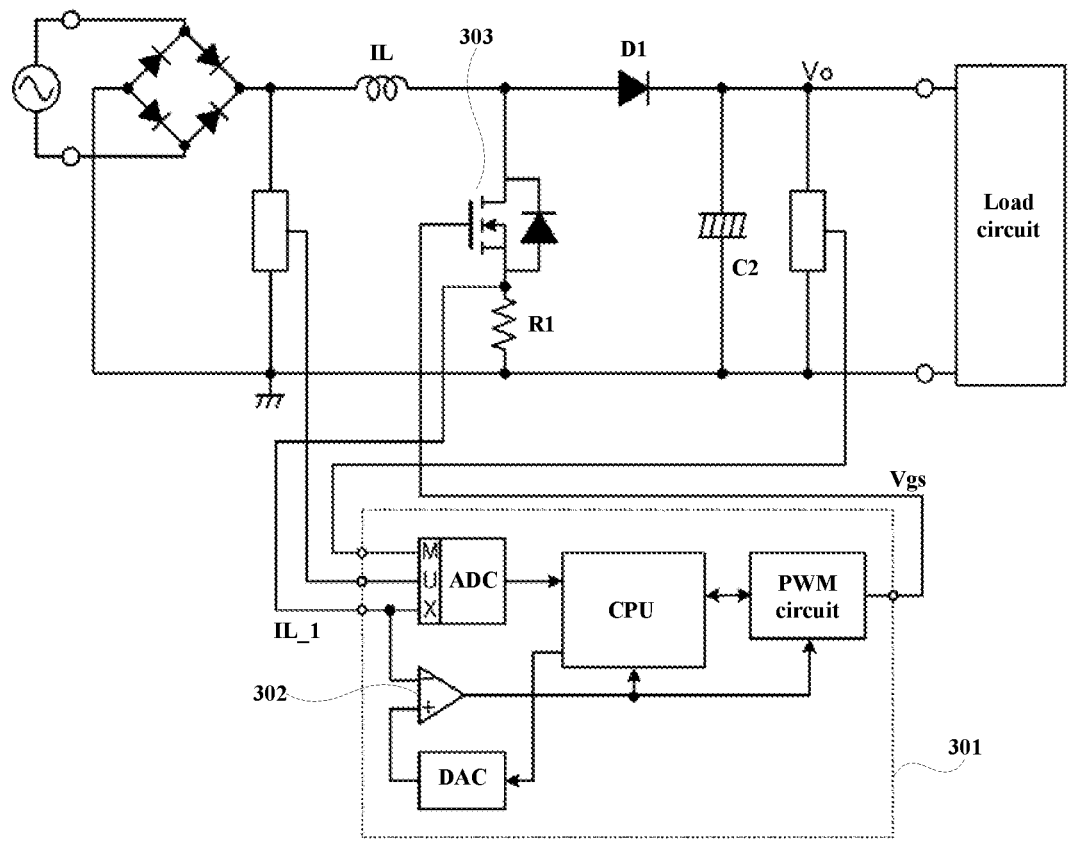
FIG. 3 is a schematic diagram which shows another PFC circuit in the prior art.
Figure 4:
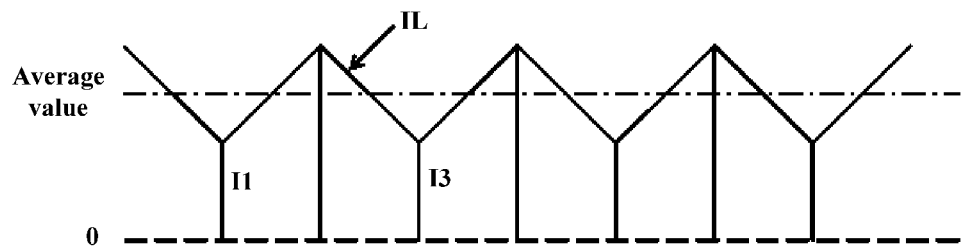
FIG. 4 is a schematic diagram which shows an inductor current in a stable status.
Figure 5:
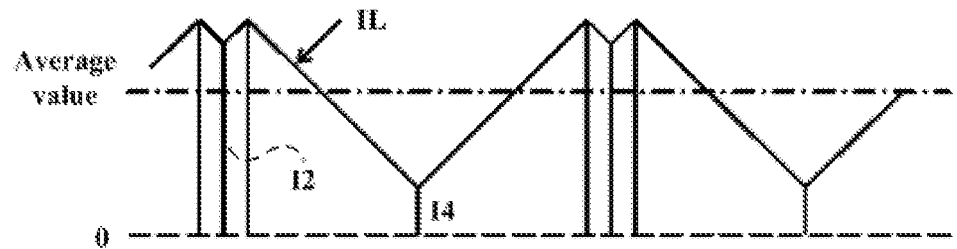
FIG. 5 is a schematic diagram which shows an inductor current in an unstable status.

In order to operate in a stable status in a PFC converter, an inductor current IL flowing through the inductor of the PFC converter needs to be stable. FIG. 4 is a schematic diagram which shows an inductor current (IL) in a stable status. As shown in FIG. 4, I1 may be (or almost be) equal to 13. FIG. 5 is a schematic diagram which shows an inductor current (IL) in an unstable status. As shown in FIG. 5, 12 may not be equal to 14.

In this disclosure, a digital controlling manner is provided to perform stable controlling with a simple structure.

A First Aspect of Embodiments

A device for calculating switching time is provided in the embodiments.

Figure 6:
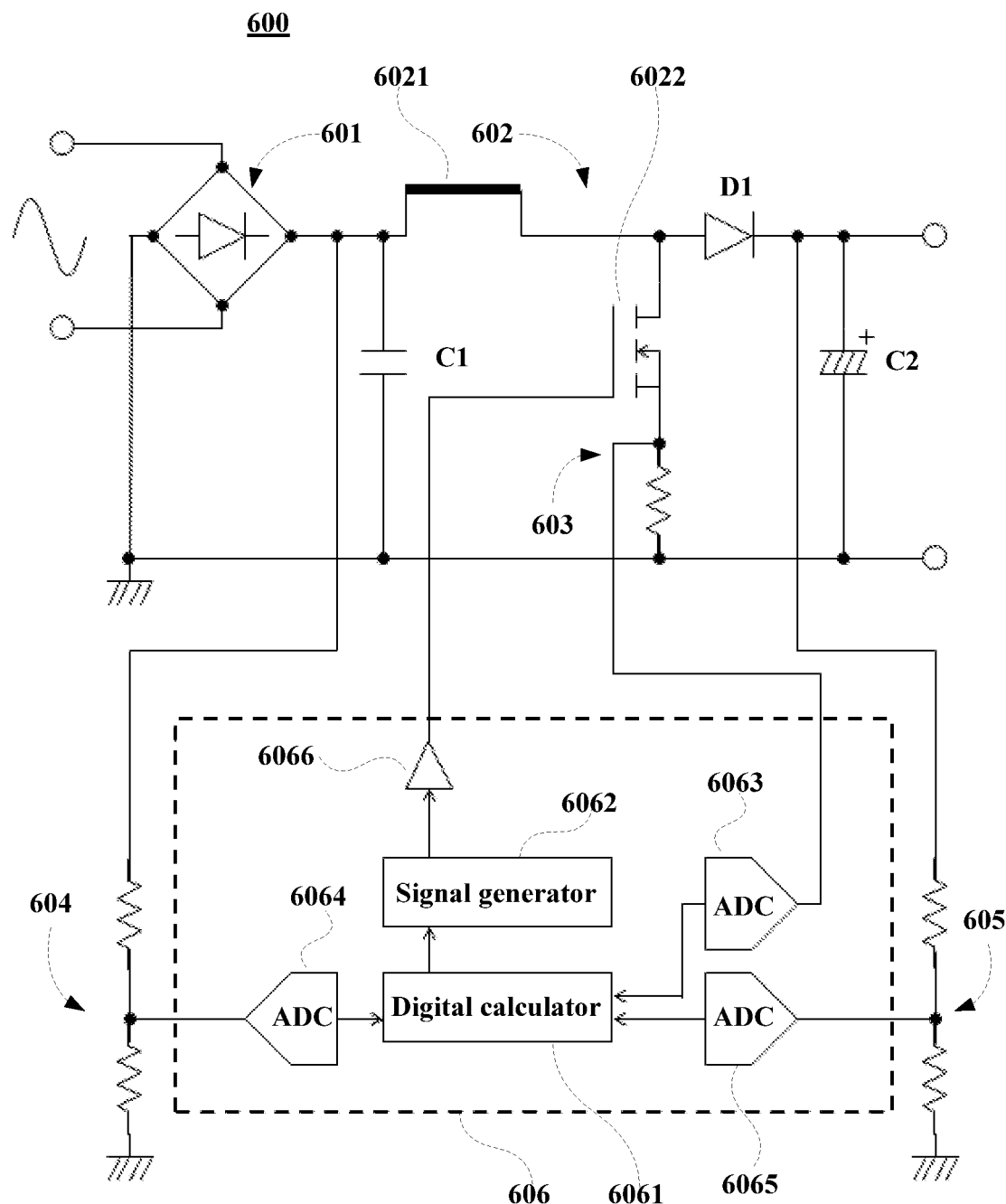
FIG. 6 is a diagram which shows a schematic illustration of a PFC converter 600 in accordance with an embodiment of the present disclosure.

FIG. 6 is a diagram which shows a schematic illustration of a PFC converter 600 in accordance with an embodiment of the present disclosure.

As shown in FIG. 6, the PFC converter 600 includes: a rectifier circuit 601 configured to rectify an alternating-current voltage received from an alternating-current power supply; a series circuit 602 configured to connect to the rectifier circuit 601, at least includes an inductor 6021 and a switching element 6022; a current detecting circuit 603 configured to detect an inductor current signal during an on period of the switching element 6022 (for example, an inductor current is sampled at a source or a drain of the switching element 6022); an input voltage detecting circuit 604 configured to detect an input voltage signal (Vin); an output voltage detecting circuit 605 configured to detect an output voltage signal (Vout).

As shown in FIG. 6, the PFC converter 600 further includes: a switching controlling circuit 606 configured to control on/off of the switching element 6022. The switching controlling circuit 606 at least includes: a digital calculator 6061 configured to calculate a next on time according to the output voltage signal and the inductor current signal detected during the on period of the switching element 6022 and calculate a next off time according to the next on time, the input voltage signal and the output voltage signal; and a signal generator 6062 configured to generate a pulse width modulation (PWM) signal for controlling the switching element 6022, according to the next on time and the next off time.

As shown in FIG. 6, the switching controlling circuit 606 may further include: a first analog-digital converter (ADC) 6063 configured to convert the inductor current signal into a digital value; a second analog-digital converter (ADC) 6064 configured to convert the input voltage signal into a digital value; and a third analog-digital converter (ADC) 6065 configured to convert the output voltage signal into a digital value.

As shown in FIG. 6, the switching controlling circuit 606 may further include: a driver 6066 configured to drive the switching element 6022 according to the PWM signal from the signal generator 6062.

It should be appreciated that some components or elements are illustrated as examples in FIG. 6. However, it is not limited thereto, for example, connections or positions of the components or elements may be adjusted, and/or, some components or elements may be omitted.

Moreover, some components or elements not shown in FIG. 6 may be added, while components or elements such as C1, C2, D1 and resistances shown in FIG. 6 but not explained can be referred in the relevant art. For example, an interleaving circuit and/or bridgeless circuit may be adopted as some examples.

In an embodiment, the digital calculator 6061 is further configured to calculate an integral value according to an average value of the inductor current signal and an on time, and calculate the next on time according to the integral value and the detected inductor current signal.

For example, the digital calculator 6061 is configured to calculate the next on time by using the formula: $T_{on}[n+1]$ =Ver/Id[n]; where, Ver denotes a target integral value of the inductor current signal during on time of the $(n+1)^{th}$ period and is based on the output voltage signal, Id[n] denotes the detected inductor current signal during on time of the $n^{th}$ period, $T_{on}[n+1]$ denotes the on time of the $(n+1)^{th}$ period.

Next, exemplary principles will be illustrated to better understand this disclosure.

Figure 7:
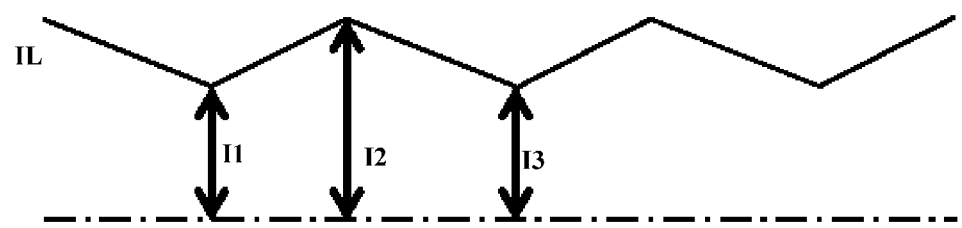
FIG. 7 is a schematic diagram which shows the inductor current in the inductor.
Figure 8:
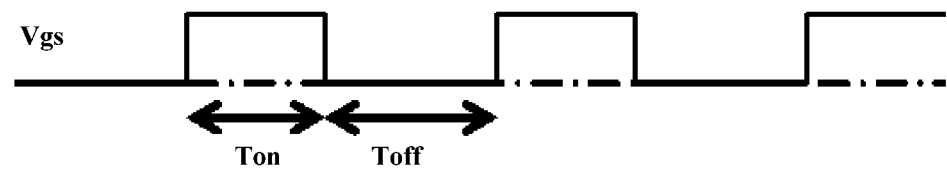
FIG. 8 is a schematic diagram which shows a driver signal from the signal generator.
Figure 9:
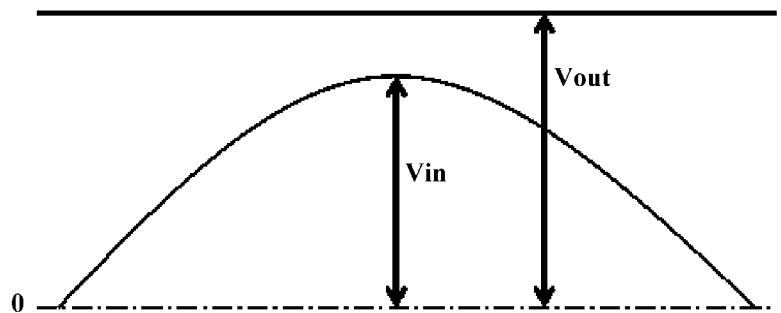
FIG. 9 is a schematic diagram which shows the input voltage signal and the output voltage signal.

FIG. 7 is a schematic diagram which shows the inductor current (IL) in the inductor 6021; FIG. 8 is a schematic diagram which shows a driver signal (Vgs) from the signal generator 6062; FIG. 9 is a schematic diagram which shows the input voltage signal (Vin) and the output voltage signal (Vout).

In order to be stable during operation of the PFC converter, I1 need to be (or almost be) equal to 13. Therefore, $Ton:Toff=(Vout-Vin):Vin$ need to be satisfied. Then $Ton \times Vin = Toff \times (Vout-Vin)$.

It assumed that Ton×Vin=A and Toff×(Vout−Vin)=A, then Ton=A/Vin and Toff=A/(Vout−Vin).

If the PFC converter is operated in a normal status, Vin∝Vin_avr×IL, ∝ denotes a proportion relationship and Vin_avr denotes an average value of Vin. Therefore, $Ton=A/(B(Vin\_avr \times IL));Toff=A/(Vout-Vin)$.

Furthermore, Ver is used as a feedback signal to control the output voltage signal and it is based on the output voltage signal (or it may depend on the output voltage signal and/or the feedback signal). For example, Ton=Ton0×Ver; Toff=Toff0×(B−C×Ver), such that gain and frequency change amplitude can be set. Then assumed that D=AB; E=A×B, F=A×C/D;

$Ton=A \times Ver/(B(Vin\_avr \times IL))=D \times Ver/(Vin\_avr \times IL);$ $Toff=A \times (B-C \times Ver)/(Vout-Vin)$ $=(A\times B-A\times C\times \text{Ver})/(\text{Vout}-\text{Vin})$ $=(A\times B-(A\times C/D)\times D\times \text{Ver})/(\text{Vout}-\text{Vin})$ $=(E-F\times D\times \text{Ver})/(\text{Vout}-\text{Vin})$;

where Ver is deemed as a control parameter, and gain controlling can be realized by using this parameter, therefore it can be deemed as D×Ver⇒Ver. Then $T\text{on}=\text{Ver}/(V\text{in\_avr}\times IL)$ $T\text{off}=(E-F\times \text{Ver})/(V\text{out}-V\text{in})$ Therefore, $T_{on}[n+1]=\text{Ver}/\text{Id}[n]$ of this disclosure is implementable. The parameters such as E, F, can be determined in consideration of gain and frequency change.

In an embodiment, the current detecting circuit 603 may be configured to detect the inductor current signal at least one time during one on period of the switching element 6022.

For example, the current detecting circuit 603 is configured to detect the inductor current signal at a moment of a half (½) of the on period (or on time); and the digital calculator 6061 is configured to determine an average value of the inductor current signal according to the inductor current signal detected at the moment of the half (½) of the on period.

Figure 10:
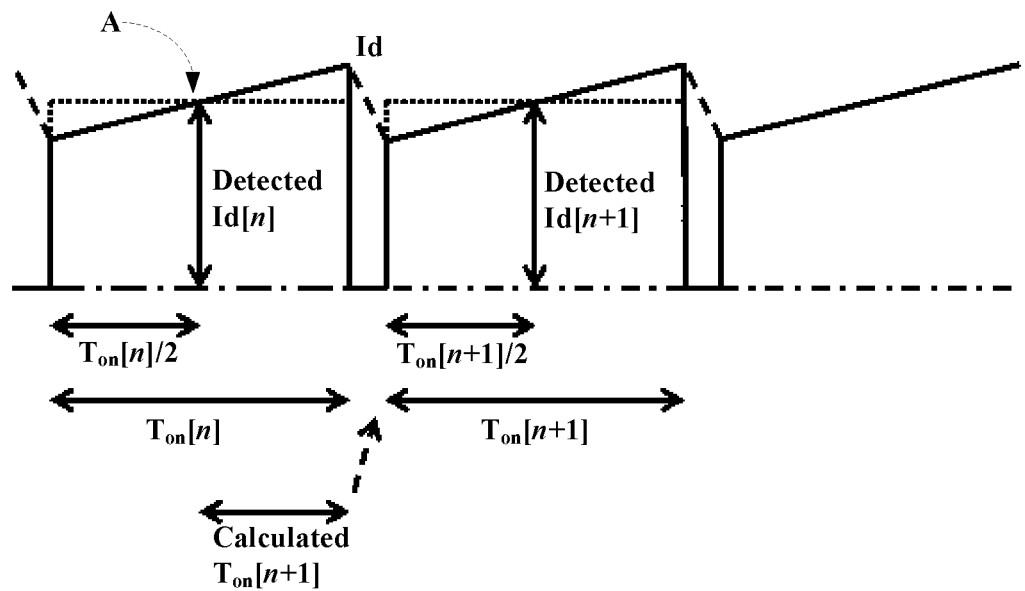
FIG. 10 is a schematic diagram which shows the inductor current in accordance with an embodiment of the present disclosure.

FIG. 10 is a schematic diagram which shows the inductor current in accordance with an embodiment of the present disclosure; as shown in FIG. 10, the inductor current signal at a moment of $T_{on}[n]/2$ (as denoted as A in FIG. 10) is sampled as the average value Id[n] of the inductor current signal. The digital calculator 6061 is configured to calculate the integral value by using the formula:

$\text{Ver}=\text{Id}[n]\times T_{on}[n]$;

where, Ver denotes a target integral value of the inductor current signal during on time of the $(n+1)^{th}$ period and is based on the output voltage signal, Id[n] denotes the inductor current signal detected at a moment of a half of the on time of the $n^{th}$ period, $T_{on}[n]$ denotes the on time of the $n^{th}$ period.

It should be appreciated that the moment of $T_{on}[n]/2$ is an example and it is not limited thereto, for example, a moment of $T_{on}[n]/3$ or a moment of $T_{on}[n]/4$ may also be used in this disclosure.

In this disclosure, the current detecting circuit 603 may be configured to detect the inductor current signal one time during one period. That is, the first analog-digital converter 6063 may be used to sample signal one time instead of sample multiple times in one period, therefore, power consumption and cost can be lowered while performance of the analog-digital converter is not need to be improved.

In an embodiment, the digital calculator 6061 is further configured to calculate a difference voltage signal according to the input voltage signal and the output voltage signal, and calculate an error voltage signal according to the output voltage signal and a reference voltage signal. Furthermore, the digital calculator 6061 is further configured to calculate the next off time according to the next on time, the difference voltage signal and the error voltage signal.

Therefore, the digital calculator 6061 can calculate $T_{on}[n+1]$ and $T_{off}[n+1]$ according to signals from the first analog-digital converter 603, the second analog-digital converter 604 and the third analog-digital converter 605, then output a signal (such as 16 bits) to the signal generator 6062.

In an embodiment, the switching controlling circuit 606 may be configured in an integrated circuit (IC) or a chip, and it is not limited thereto. An analog comparator is not required in the switching controlling circuit 606, therefore the number of components and the cost can be decreased; furthermore, an inductor current is detected (or sampled) during the on time and the next on/off time is calculated in advance, therefore detection accuracy can be improved.

It is to be understood that, the above examples or embodiments are discussed for illustration, rather than limitation. Those skilled in the art would appreciate that there may be many other embodiments or examples within the scope of the present disclosure.

It can be seen from the above embodiments, a digital calculator is configured to calculate a next on time according to an output voltage signal and an inductor current signal detected during an on period of a switching element and calculate a next off time according to the next on time, an input voltage signal and the output voltage signal. Therefore, a digital controlling manner is provided, not only the number of components and the cost are decreased, but also detection accuracy is improved with a simple structure.

A Second Aspect of Embodiments

A method for calculating switching time is provided in the embodiments. The corresponding device 606 and the PFC converter 600 are illustrated in the first aspect of embodiments, and the same contents as those in the first aspect of embodiments are omitted.

Figure 11:
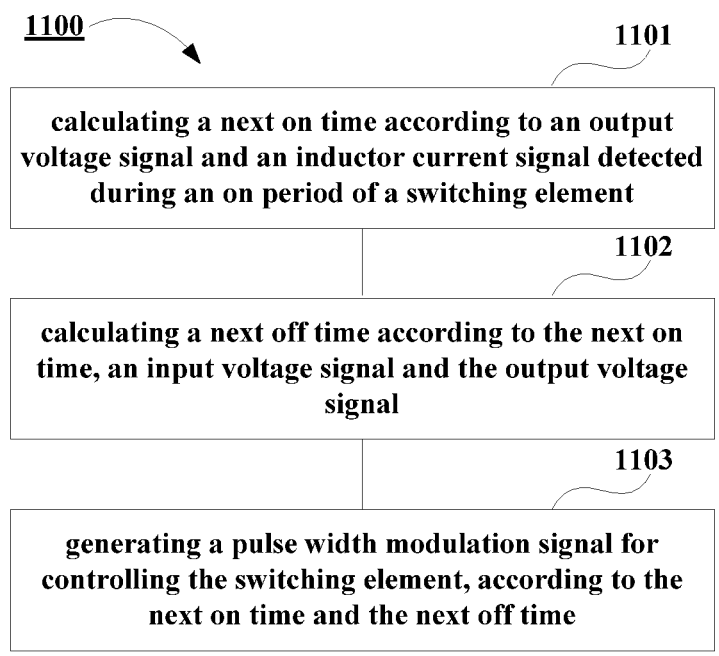
FIG. 11 is a diagram which shows a method for calculating switching time in accordance with an embodiment of the present disclosure.

FIG. 11 is a diagram which shows a method for calculating switching time in accordance with an embodiment of the present disclosure. As shown in FIG. 11, the method 1100 includes:

Block 1101, calculating a next on time according to an output voltage signal and an inductor current signal detected during an on period of a switching element;

Block 1102, calculating a next off time according to the next on time, an input voltage signal and the output voltage signal; and Block 1103, generating a pulse width modulation signal for controlling the switching element, according to the next on time and the next off time.

It should be appreciated that FIG. 11 is only an example of the disclosure, but it is not limited thereto. For example, the order of operations at blocks or steps may be adjusted, and/or, some blocks or steps may be omitted. Moreover, some blocks or steps not shown in FIG. 11 may be added.

In an embodiment, the method 1100 may further include: calculating an integral value according to an average value of the inductor current signal and an on time, and the next on time is calculated according to the integral value and the detected inductor current signal.

For example, the next on time is calculated by using the formula: $T_{on}[n+1]=\text{Ver}/\text{Id}[n]$; where, Ver denotes a target integral value of the inductor current signal during on time of the $(n+1)^{th}$ period and is based on the output voltage signal, Id[n] denotes the detected inductor current signal during on time of the $n^{th}$ period, $T_{on}[n+1]$ denotes the on time of the $(n+1)^{th}$ period.

In an embodiment, the inductor current signal may be detected at least one time during one on period of the switching element.

For example, the inductor current signal is detected at a moment of a half of the on period; and an average value of the inductor current signal is determined according to the inductor current signal detected at the moment of the half of the on period.

For example, the integral value is calculated by using the formula: Ver=Id[n]×$T_{on}$[n]; where, Ver denotes a target integral value of the inductor current signal during on time of the (n+1)$^{th}$ period and is based on the output voltage signal, Id[n] denotes the inductor current signal detected at a moment of a half of the on time of the n$^{th}$ period, $T_{on}$[n] denotes the on time of the n$^{th}$ period.

In an embodiment, the method may further include: calculating a difference voltage signal according to the input voltage signal and the output voltage signal, and calculating an error voltage signal according to the output voltage signal and a reference voltage signal. The next off time is calculated according to the next on time, the difference voltage signal and the error voltage signal.

It can be seen from the above embodiments, a digital calculator is configured to calculate a next on time according to an output voltage signal and an inductor current signal detected during an on period of a switching element and calculate a next off time according to the next on time, an input voltage signal and the output voltage signal. Therefore, a digital controlling manner is provided, not only the number of components and the cost are decreased, but also detection accuracy is improved with a simple structure.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and integrated circuits (ICs) with minimal experimentation.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device.

While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous.

Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A device for calculating switching time, comprising:
   a digital calculator configured to calculate a next on time according to an output voltage signal and an inductor current signal detected during an on period of a switching element and calculate a next off time according to the next on time, an input voltage signal and the output voltage signal;
   a signal generator configured to generate a pulse width modulation signal for controlling the switching element, according to the next on time and the next off time;
   wherein the digital calculator is configured to calculate the next on time by using a formula:

$$T_{on}[n+1]=Ver/Id[n];$$

where, Ver denotes a target integral value of the inductor current signal during an on time of an (n+1)$^{th}$ period and is based on the output voltage signal, Id[n] denotes an inductor current signal detected during an on time of an n$^{th}$ period, $T_{on}$[n+1] denotes the on time of the (n+1)$^{th}$ period, n is an integer larger than 0.

2. The device according to claim 1, wherein the device further comprises:
   a first analog-digital converter configured to convert the inductor current signal into a digital value;
   a second analog-digital converter configured to convert the input voltage signal into a digital value; and
   a third analog-digital converter configured to convert the output voltage signal into a digital value.

3. The device according to claim 1, wherein the device further comprises:
   a current detecting circuit configured to detect the inductor current signal during the on period of the switching element;
   an input voltage detecting circuit configured to detect the input voltage signal; and
   an output voltage detecting circuit configured to detect the output voltage signal.

4. The device according to claim 3, wherein the current detecting circuit is configured to detect the inductor current signal at least one time during the on period of the switching element.

5. The device according to claim 4, wherein the current detecting circuit is configured to detect the inductor current signal at a moment of a half of the on period;
   and the digital calculator is configured to determine an average value of the inductor current signal according to the inductor current signal detected at the moment of the half of the on period.

6. The device according to claim 1, wherein the digital calculator is configured to calculate the integral value by using a formula:

$$Ver=Id[n] \times T_{on}[n];$$

where, Ver denotes a target integral value of the inductor current signal during an on time of an (n+1)$^{th}$ period and is based on the output voltage signal, Id[n] denotes an inductor current signal detected at a moment of a half of an on time of an n$^{th}$ period, $T_{on}$[n] denotes the on time of the n$^{th}$ period, n is an integer larger then 0.

7. The device according to claim 1, wherein the digital calculator is further configured to calculate a difference voltage signal according to the input voltage signal and the output voltage signal, and calculate an error voltage signal according to the output voltage signal and a reference voltage signal.

8. The device according to claim 7, wherein the digital calculator is further configured to calculate the next off time according to the next on time, the difference voltage signal and the error voltage signal.

9. A power factor correction converter, comprising:
a rectifier circuit configured to rectify an alternating-current voltage received from an alternating-current power supply;
a series circuit configured to connect to the rectifier circuit, at least comprise an inductor and a switching element;
a current detecting circuit configured to detect an inductor current signal during an on period of the switching element;
an input voltage detecting circuit configured to detect an input voltage signal;
an output voltage detecting circuit configured to detect an output voltage signal; and
a switching controlling circuit configured to control on/off of the switching element, wherein the switching controlling circuit at least comprises:
a digital calculator configured to calculate a next on time according to the output voltage signal and the inductor current signal detected during the on period of the switching element and calculate a next off time according to the next on time, the input voltage signal and the output voltage signal;
a signal generator configured to generate a pulse width modulation signal for controlling the switching element, according to the next on time and the next off time;
wherein the digital calculator is configured to calculate the next on time by using a formula:

$$T_{on}[n+1]=Ver/Id[n];$$

where, Ver denotes a target integral value of the inductor current signal during an on time of an $(n+1)^{th}$ period and is based on the output voltage signal, Id[n] denotes an inductor current signal detected during an on time of an $n^{th}$ period, $T_{on}[n+1]$ denotes the on time of the $(n+1)^{th}$ period, n is an integer larger than 0.

10. The power factor correction converter according to claim 9, wherein the switching controlling circuit further comprises:
a first analog-digital converter configured to convert the inductor current signal into a digital value;

a second analog-digital converter configured to convert the input voltage signal into a digital value; and
a third analog-digital converter configured to convert the output voltage signal into a digital value.

11. A method for calculating switching time, comprising:
calculating a next on time according to an output voltage signal and an inductor current signal detected during an on period of a switching element;
calculating a next off time according to the next on time, an input voltage signal and the output voltage signal;
generating a pulse width modulation signal for controlling the switching element, according to the next on time and the next off time;
wherein the next on time is calculated by using a formula:

$$T_{on}[n+1]=Ver/Id[n];$$

where, Ver denotes a target integral value of the inductor current signal during an on time of an $(n+1)^{th}$ period and is based on the output voltage signal, Id[n] denotes an inductor current signal detected during an on time of an $n^{th}$ period, $T_{on}[n+1]$ denotes the on time of the $(n+1)^{th}$ period, n is an integer larger than 0.

12. The method according to claim 11, wherein the inductor current signal is detected at least one time during the on period of the switching element.

13. The method according to claim 12, wherein the inductor current signal is detected at a moment of a half of the on period;
and an average value of the inductor current signal is determined according to the inductor current signal detected at the moment of the half of the on period.

14. The method according to claim 11, wherein the integral value is calculated by using a formula:

$$Ver=Id[n]\times T_{on}[n];$$

where, Ver denotes a target integral value of the inductor current signal during an on time of an $(n+1)^{th}$ period and is based on the output voltage signal, Id[n] denotes an inductor current signal detected at a moment of a half of an on time of an $n^{th}$ period, $T_{on}[n]$ denotes the on time of the $n^{th}$ period, n is an integer larger than 0.

15. The method according to claim 11, wherein the method further comprises:
calculating a difference voltage signal according to the input voltage signal and the output voltage signal, and calculating an error voltage signal according to the output voltage signal and a reference voltage signal.

16. The method according to claim 15, wherein the next off time is calculated according to the next on time, the difference voltage signal and the error voltage signal.

* * * * *